Figure 1:
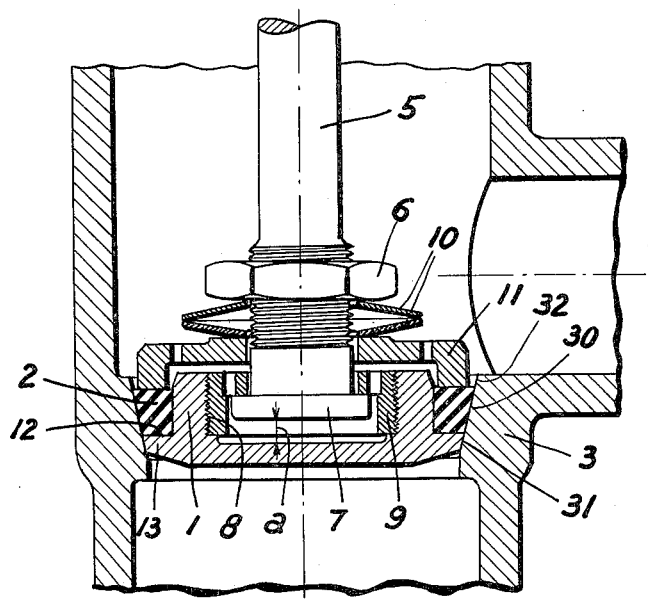

Oct. 12, 1965 H. KLINGER LOHR 3,211,418
SHUT-OFF VALVE
Filed March 18, 1963

INVENTOR
Hubert Klinger Lohr

BY Michael S. Striker
ATTORNEY

United States Patent Office 3,211,418
Patented Oct. 12, 1965

3,211,418
SHUT-OFF VALVE
Hubert Klinger-Lohr, Modling, Lower Austria, Austria, assignor to Istag A.G., Suhr, Aargau, Switzerland
Filed Mar. 18, 1963, Ser. No. 265,876
Claims priority, application Austria, Mar. 21, 1962, A 2,315/62
5 Claims. (Cl. 251—176)

This invention relates to a shut-off valve which comprises a piston, which carries at least one axially compressible sealing ring for sealing the piston in the housing in the closed position of the valve and which valve is essentially characterized in that said sealing ring is under the compressing action of a spring, which bears on a part axially fixed to the spindle for the piston, and that the piston part which holds the sealing ring and backs it against the force of the spring is coupled to the spindle and capable of a limited axial movement relative thereto and serves for taking up an opposing force acting in the valve-opening direction and additionally compressing the sealing ring during the closing operation. For the latter purpose, e.g., the piston part holding the sealing ring may form with its end facing away from the backing surface for the sealing ring a surface for engaging a surface which is rigid with the housing.

Valves of this kind have the advantage that the sealing ring is constantly under the elastic initial stress of the spring and this initial stress can be increased in the closed position of the piston.

Like all known piston valves shut-off valves of this kind have a sealing surface for sealing against the housing, which has the form of a cylindrical shell, and therefore have the disadvantage that they can be operated only with difficulty in the case of relatively large nominal widths or elevated operating pressures, if the closing movement is opposed by the pressure exerted by the controlled fluid on the piston, as is mostly the case. Whereas the valve is already closed when the piston enters a portion of the valve seat in the housing, the movement of the piston must be continued until the piston has reached its ultimate position in order to use the entire periphery of the sealing ring for sealing if a reliable seal is to be ensured for a prolonged period of operation. Particularly when the controlled fluid is under a high pressure or when the nominal width and consequently the end faces of the piston are large, the continued movement of the piston when it has entered its seat is opposed by substantial forces.

According to a prior proposal this disadvantage may be avoided if the piston part holding the sealing ring has a passage, which together with the free end portion of the spindle forms a release valve which is held open by the spring. This release valve is supposed to act so as to close only at the end of the sealing movement of the piston when the piston is held in this ultimate position and the movement of the free end portion of the spindle can then be continued until the release valve is closed.

This design, however, involves relatively high manufacturing costs and will not operate reliably if the frictional resistance encountered by the piston as it enters the valve seat is already so high that the spring is highly compressed under the influence of this resistance so that the release valve is already virtually closed when the piston is in this position.

It is an object of the invention to improve the valves embodying the above-mentioned prior proposal and to provide a valve structure which involves a very small expenditure and yet insures that the valve will not be entirely closed until the closing movement has been completed whereas it is nevertheless possible to subject the sealing ring to an increased elastic pressure by the more highly compressed spring when the valve is closed.

A shut-off valve which accomplishes this object and embodies said prior proposal is essentially characterized in that the sealing ring has a peripheral surface which forms the sealing surface for engaging the housing and which tapers in the direction of the closing movement of the piston and cooperates with a housing bore which has a conforming tapered shape and forms the sealing seat. Because the piston has a taper in the direction of the closing movement and the housing bore has a similar taper, the valve will not be completely closed until the closing movement has been completed so that an equalization of pressure is enabled through the annular clearance which remains open until the movement has been completed. If the piston part for taking up the opposing force has an outside surface which axially adjoins the tapered surface of the sealing ring and which forms an extension of the tapered surface of the sealing ring, and if the tapered sealing seat in the housing serves also as an abutment for said piston part, the movement of the spindle in the closing direction can be continued when the piston has been seated in the tapered housing bore. By this continued movement of the spindle, the sealing ring is subjected to an increased elastic pressure by the spring and only thereby becomes fully effective. At the end of the closing movement, the tapered surface formed by the peripheral surface of the sealing ring and by the outside surface of the piston part backing the sealing ring, which outside surface axially adjoins this peripheral surface, is in uniform engagement with the tapered housing bore. Only when the continued movement of the spindle causes the piston part which backs the sealing ring against the spring force to bear on the tapered housing bore is the sealing ring subjected to an increased spring pressure, by which the sealing ring is forced against the housing bore so as to afford a good seal.

Alternatively, the additional compression of the sealing ring may be effected in another manner. If the piston is designed so that the piston part for taking up the opposing force is clear of the housing when the valve is in closed position and if said piston part is disposed in the flow passage of the housing on the upstream side thereof, an opposing force which additionally compresses the sealing ring during the closing operation will be exerted by the pressure of the fluid acting on said piston part. This embodiment is of special advantage if the valve is actuated by a motor rather than by hand. In this case the actuating motor may operate at relatively high speed because the closing movement does not result in a metallic contact between the piston and the housing. Such metallic contact would involve an impact on the housing in the case of a rapid closing movement.

To ensure a long life of the sealing ring, care must be taken that the spring acting on the upper annular end face of the valve ring does not cause a detrimental deformation of the sealing ring in the open position of the piston by squeezing downwardly the ring portion radially protruding beyond the narrower lower annular end face. According to another feature of the invention, this danger is avoided in that the tapered peripheral surface of the piston is conical and its inclination with respect to its direction of movement is 5–30°, preferably 10–15°. With such a small inclination the conical surface is still effective but does not involve an additional deformation of that portion of the sealing ring which is larger in diameter.

The invention will now be explained with reference to two embodiments shown by way of example in FIGS. 1 and 2, respectively of the accompanying drawings. In the embodiment shown in FIG. 1, a piston body 1 carries a sealing ring 2. The piston is mounted on the free end portion of a spindle 5 so as to be rotatable thereon and to be axially movable relative to the spindle by the distance $a$. For this purpose, the free end portion of the spindle has a collar 7, which is disposed in a bore 8 coaxial with the piston body 1 and limits the downward axial movement of a supporting ring 9, which is axially slidable on the spindle and in threaded engagement with this bore of the piston body so that the spindle is axially coupled to the piston with a certain backlash. A nut 6 is in threaded engagement with the free end of the spindle. For elastically compressing the sealing ring 2 a set of plate springs 10 and a piston cap 11 are mounted between the nut 6 threaded on the spindle and the collar 7 of the end portion of the spindle. The piston cap 11 transmits the pressure of the spring 10 to the sealing ring, which is supported on one end face 12 by a shoulder 13 of the piston body 1 so that the sealing ring is constantly subjected to an elastic axial pressure. The peripheral surface 30 of the sealing ring 2 and that outside surface 31 of the piston body 1 which axially adjoins this peripheral surface 30 have the shape of a frustum of a cone which tapers in the closing direction. When the piston is in its closed position, shown in the drawing, this part of the piston mates a similar conical bore 32 of the housing 3. In the drawing, the spindle is shown in the position assumed by it when the piston has been caused to seat on the conical housing bore. During a continued movement of the spindle in the closing direction, the piston body 1 is thus held in position in the bore so that the spindle can move downwardly within the piston body by the distance $a$. By the continued downward movement of the spindle, the spring 10 is further compressed to exert a higher pressure on the sealing ring 2, which will then be seated more tightly against the conical bore 32.

When the spindle is subsequently moved in the opening sense, the spindle will first move upwardly by the distance $a$ without carrying the piston along. This will result in a reduction of the initial stress of the spring. When the distance $a$ has been traversed, the spindle will lift the piston by means of the supporting ring 9 so that the entire piston moves upwardly. Even in the open position of the valve, the sealing ring of the piston is under an initial stress due to the action of the spring. The relatively small taper of the conical peripheral surface of the piston prevents an intolerable deformation of the upper portion of the ring, which is larger in diameter.

If the underside of the piston body 1 faces the upstream side of the valve, in the illustrated embodiment, the desired additional compression of the sealing ring during the closing operation of the valve can be promoted by the pressure of the fluid in the valve. In this case the piston body need not be seated in the housing bore in the closed position but may be clear of this bore. In such case, the piston body is forced against the sealing ring by the pressure of the fluid.

Figure 2:
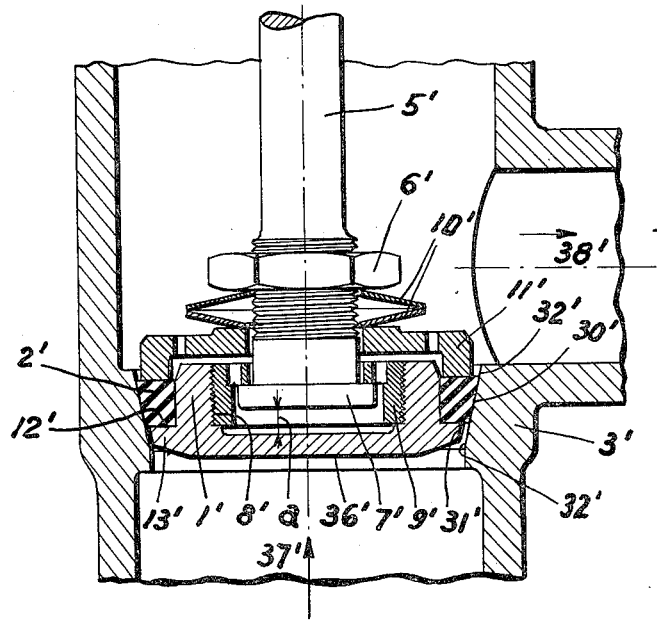

Such a modification is shown in FIG. 2, in which corresponding parts are designated with like reference numerals provided with a prime ('). In this modification, the piston body 1' has a conical outside peripheral surface 31' which axially adjoins the conical outside peripheral surface 30' of the sealing ring 2' and is clear of the conical bore 32' when the surface 30' engages the bore 32'.

The piston body 1' has opposite to the spindle 5' an end face 36' facing the upstream portion 37' of the flow passage in the housing. The downstream portion of this flow passage is indicated at 38'. The direction of flow is indicated by arrows.

What I claim is:

1. A shut-off valve comprising, in combination, a valve housing defining a flow passage and a tapered bore defining a valve seat in said flow passage; a spindle mounted in said housing axially aligned with said bore and axially movable toward said bore in the direction of the taper of said bore and away from said bore in the opposite direction; a piston mounted on said spindle for limited axial movement relative thereto; an axially compressible sealing ring having a tapered outer peripheral surface conforming to said bore and a pair of annular end surfaces one facing the smaller diameter end of said tapered bore, said one end surface being supported on said piston; an annular member about said spindle spaced from said piston and axially movable with respect to said spindle and said piston and having an annular portion engaging the other end surface of said sealing ring; compression spring means engaging with one end thereof said annular member on the side of the latter facing away from said sealing ring; and abutment means fixed to said spindle and engaging the other end of said compression spring means to bias the latter toward said sealing ring, whereby during movement of said spindle toward said bore and after engagement of said outer peripheral surface of said sealing ring with said bore, further movement of said spindle will cause increased compression of said spring means and thereby increased pressure of said peripheral surface of said sealing ring against the bore surface while said spindle will not exert during this movement axial pressure on said piston.

2. A shut-off valve as set forth in claim 1, in which said valve passage has an upstream portion at the small end of said bore and a downstream portion at the large end of said bore and said piston is arranged to be clear of said housing when said peripheral outside surface of said sealing ring engages said bore.

3. A shut-off valve as set forth in claim 1, in which said bore is conical and has an inclination of 5–30° with respect to the axis thereof.

4. A shut-off valve as set forth in claim 1, in which said bore is conical and has an inclination of 10–15° with respect to the axis thereof.

5. A shut-off valve comprising, in combination, a valve housing defining a flow passage and a tapered bore defining a valve seat in said flow passage; a spindle mounted in said housing axially aligned with said bore and axially movable toward said bore in the direction of the taper of said bore and away from said bore in the opposite direction; a piston mounted on said spindle for limited axial movement relative thereto, said piston having a shoulder portion having a tapered outer surface conforming to said bore; an axially compressible sealing ring having a tapered outer peripheral surface conforming to said bore and a pair of annular end surfaces one facing the smaller diameter end of said tapered bore, said one end surface being supported on said shoulder portion of said piston, said tapered outer peripheral surface of said sealing ring forming a continuation of that of said piston; an annular member about said spindle spaced from said piston and axially movable with respect to said spindle and said piston and having an annular portion engaging the other end surface of said sealing ring; compression spring means egaging with one end thereof said annular member on the side of the latter facing away from said sealing ring; and abutment means fixed to said spindle and engaging the other end of said compression spring means to bias the latter toward said sealing ring, whereby during movement of said spindle toward said bore and after engagement of said outer peripheral surface of said piston with said bore, further movement of said spindle will cause increased compression of said spring means and thereby increased pressure of said peripheral surface of said sealing ring against the bore surface while said spindle will not exert during this movement increased pressure of said peripheral surface of said piston against said bore surface.

References Cited by the Examiner

UNITED STATES PATENTS

| | | | |
|---|---|---|---|
| 1,413,764 | 4/22 | Mueller | 251—357 |
| 1,686,849 | 10/28 | Frauenheim | 251—357 XR |
| 1,792,945 | 2/31 | Van Deventer | 251—357 XR |
| 1,991,052 | 2/35 | Derby | 251—357 XR |
| 2,106,736 | 2/38 | Hass | 251—187 XR |
| 2,772,849 | 12/56 | Davis | 251—194 |

FOREIGN PATENTS 1,126,689   3/62   Germany.

M. CARY NELSON, *Primary Examiner.*

LAVERNE D. GEIGER, *Examiner.*